(No Model.)

T. B. JEFFERY.
WHEEL TIRE.

No. 454,115. Patented June 16, 1891.

Witnesses:
Jean Elliott.
Julia Usher.

Inventor:
Thos. B. Jeffery
By Burton and Burton
his Attorneys.

UNITED STATES PATENT OFFICE.

THOMAS B. JEFFERY, OF CHICAGO, ILLINOIS.

WHEEL-TIRE.

SPECIFICATION forming part of Letters Patent No. 454,115, dated June 16, 1891.

Application filed March 26, 1891. Serial No. 386,459. (No model.)

*To all whom it may concern:*

Be it known that I, THOMAS B. JEFFERY, a citizen of the United States, residing at Chicago, county of Cook, and State of Illinois, have invented certain new and useful Improvements in Wheel-Tires, which are fully set forth in the following specification, reference being had to the accompanying drawings, forming a part thereof.

This invention is designed to provide improved means for protecting a rubber wheel-tire, and is particularly designed and adapted for an inflation-tire—that is to say, a tire having a core composed of elastically-expansible tube, which is inflated by air or gas and distended thereby to some extent, the air or gas being under such tension that but for a restraining or inclosing sheath such core would be liable to burst.

Figure 1:
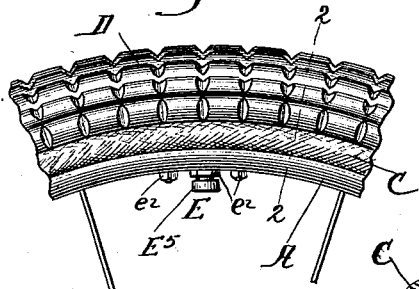
Figure 2:
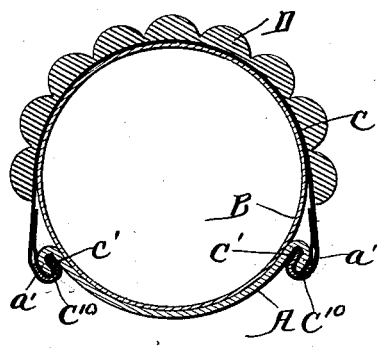
Figure 4:
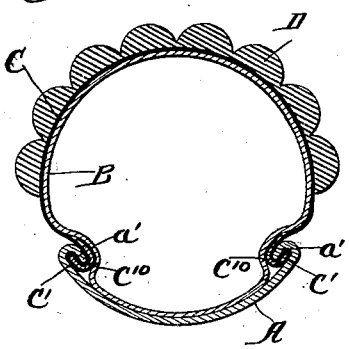
Figure 3:
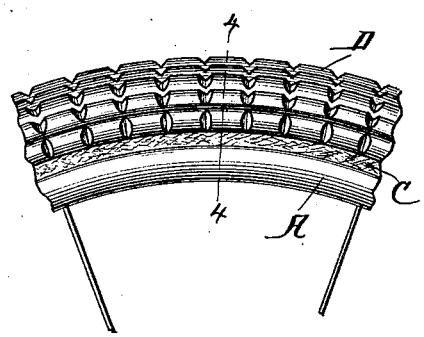
Figure 5:
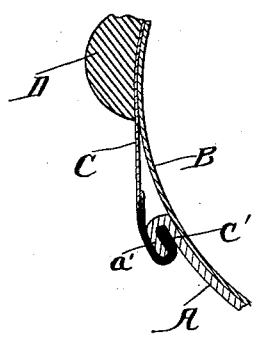
Figure 6:
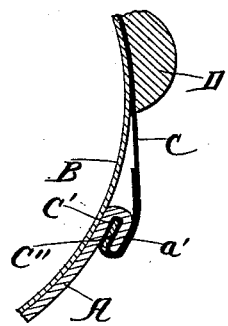
Figure 7:
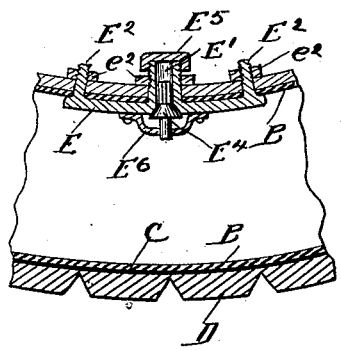

In the drawings, Figure 1 is a side elevation of a portion of the wheel rim and tire embodying my invention. Fig. 2 is a section at the line 2 2 on Fig. 1. Fig. 3 is a detail side elevation similar to Fig. 1, but showing a slightly-modified form of my invention. Fig. 4 is a section at the line 4 4 on Fig. 3. Fig. 5 is a detail cross-section showing the connection of the sheath to the tire in a form slightly different from that shown in Figs. 2 and 4. Fig. 6 is a similar detail of a further modification of said connection. Fig. 7 is a longitudinal section of a portion of the tire and showing the valve for inflating the same.

A is the wheel-rim.

B is the inflatable core which constitutes the body of the tire.

C is the tire-sheath.

D is an armor or covering applied outside of the tire-sheath on the tread of the tire.

E is a fitting comprising a valved induction-duct through which the core may be inflated.

The rim A is provided with hooked edges $a'$ $a'$. The hooks may be turned either inward or outward. The first form is shown in Figs. 1 and 2, and the second form in Figs. 3 and 4. The tire-sheath C is provided with correspondingly-hooked edges $C'$ $C'$. It is not essential either in case of the rim or the sheath that the hooks be coextensive with the edges—that is, that they comprise the entire edge—although it is convenient to so construct them, and they are so illustrated. Ordinarily the entire sheath C will be made of canvas or similar woven fabric comparatively inelastic, and in that event the hooked edges will be stiffened. This may be done either by saturating the fabric with a stiffening substance—as, for example, caoutchouc or india-rubber—which may be vulcanized if the sheath is made of suitable substance to endure the temperature necessary for the vulcanizing process, or other stiffening which will not require such heat to harden it may be employed—or in lieu of saturating the fabric with a substance capable of being hardened therein metallic strips may be employed for such hooked edges, and in that event it is not necessary, although it may be desirable, to cement the strips to the canvas; but the canvas, being merely folded thereabout, will be retained when the edges thus wrapped and re-enforced are engaged with the hooks at the edges of the rim.

In Fig. 4 I have shown the sheath as made of canvas and provided with a strip of rigid metal $C^{10}$, said strip and canvas together being folded to form the hook $C'$. In this construction the strip is merely the stiffening for the hooked edge of the sheath.

In Fig. 5 the sheath is represented as being stiffened by some saturating substance and suitably folded to form the hook $C'$.

In Fig. 6 the edge of the sheath is represented as wrapped around a stiffening-strip $C^{11}$ and folded, the stiffening-strip not being itself folded, but forming the edge which is engaged with the corresponding hook on the rim. In this last construction it is desirable, if not absolutely necessary, that the material of the flexible sheath should fill closely the space between the hook and body of the rim around the strip $C^{11}$, so that the liability of the flexible material of said sheath to be drawn out by being unwrapped from the stiffening-strip $C^{11}$ shall be reduced to a minimum. On some accounts the hooks on the rim are preferably turned outward, chiefly because the center of the body or inflatable core B is thereby rendered free from the irregularity which the hooks form when they are turned inward. On the other hand, the liability of the sheath-hooks to be pulled out from the rim-hooks by the expansive tendency of the core when inflated is somewhat less when the hooks are turned inward; but practically the two methods are about equally desirable. In either case it should be observed that the hook is open toward the axis, and it is preferably approximately in the direction of a tangent to the inflatable core, so that the expansible tendency of the core will tend to draw the hooks into close engagement.

The sheath C should be protected from wear at the tread, and it is important that this protection should not diminish its flexibility to any important extent nor in any way prevent the tire from having the full elasticity which the inflated core can give it, and in order that such protection may not interfere with the flexibility I make it in the form of the armor D, which may be made of rubber, and I corrugate this armor transversely by furrows which nearly penetrate the thickness, leaving only a thin web of rubber to be flexed as the tire meets with obstructions and yield inward for them. It is desirable, also, that this armor should be furrowed longitudinally as well as transversely, so that it is practically cut up into small squares $d$ between the intersecting longitudinal transverse furrows, its flexure as it encounters obstacles and irregularities in the track occurring at the line of the transverse and longitudinal furrows, the intermediate squares of undiminished thickness being merely subjected to slight compression, but not necessarily bending to any appreciable extent.

As heretofore constructed the tube or nipple through which the inflation of the inflatable core is effected is liable to work loose in the substance of the core, so that leakage occurs about it, this effect being caused by the strain experienced at its junction in screwing on and unscrewing the coupling which connects it with the tube through which air is forced into it, or the cap which closes after inflation, and also by the unavoidable wrenching of it in the process of inflation. I overcome this defect by employing the fitting E, (shown in the drawings,) which consists of a plate or base from which protrude the short tubular boss $E'$, constituting the induction tube or nipple, and one or more rigid pins or studs $E^2 E^2$. This fitting is inserted into the inflatable core, and the projections $E^2 E^2$ and $E'$ are protruded through the wall of the same and pass through suitable apertures made for them in the rim, and nuts $e^2$ are applied onto at least two of said projections outside the rim, whereby the said fitting is bound tightly in place. The tubular boss $E'$ may have the check-valve $E^4$ seated at its inner end, and the protruding threaded end may be coupled to a pipe for inflation, and a cap $E^5$ may be used as a precautionary device, in addition to the check-valve, to close the pipe when the wheel is in use. A suitable retaining-cage $E^6$ will also be provided for the check-valve $E^4$.

I claim—

1. In combination with the rim having recesses open toward the axis of the wheel, the tire-sheath having its edges reversed and engaged in such recesses, and the elastic expansible core between the rim and sheath, substantially as set forth.

2. In combination with the rim having hooked lateral edges, the tire-sheath transversely flexible and having hooked edges which detachably engage the hooked edges of the rim, substantially as set forth.

3. In combination with the flexible tire-sheath having rigid hooked edges, the rim having hooked edges to engage those of the sheath, substantially as set forth.

4. In combination with an inflatable core, the rim in which such core is seated, having its edges reversed to form hooked flanges approximately tangential to the core, and the flexible sheath for such core, having its edges engaged in such hooked flanges, substantially as set forth.

5. In combination with the rim having hooked lateral edges, the flexible sheath and rigid strips about which the lateral edges of the sheath are wrapped, inserted with the enwrapping-sheath edges within the hooks at the edges of the rim, substantially as set forth.

6. In combination with the rim having hooked lateral edges, the flexible sheath and rigid strips about which the lateral edges of the sheath are wrapped, such strips being folded with the enwrapping sheath to form rigid hooks at the edges of such sheath, such hooks being engaged with the hooks at the edges of the rim, substantially as set forth.

7. In a wheel-tire, in combination with an inflatable core, an armor for the tread of the tire, composed of rubber or like elastic substance transversely grooved or corrugated, substantially as set forth.

8. In a wheel-tire, in combination with an inflatable core, an armor for the tread of the tire, composed of rubber or like elastic substance grooved or corrugated both transversely and peripherally or longitudinally, substantially as set forth.

9. In a wheel-tire, the rim and inflatable core seated therein, and the induction-tube having rigid with it one or more studs, the rim having apertures through which said stud or studs and tube project, and nuts applied on the projecting ends thereof to bind the tube rigidly to the tire, substantially as set forth.

In testimony whereof I have hereunto set my hand, in the presence of two witnesses, at Chicago, Illinois, this 18th day of March, 1891.

THOS. B. JEFFERY.

Witnesses:
CHAS. S. BURTON,
JEAN ELLIOTT.